(12) United States Patent
Zhang et al.

(10) Patent No.: US 10,705,662 B2
(45) Date of Patent: Jul. 7, 2020

(54) TOUCH SUBSTRATE AND PREPARATION METHOD THEREFOR, AND DISPLAY PANEL

(71) Applicants: Hefei Xinsheng Optoelectronics Technology Co., Ltd., Hefei (CN); BOE Technology Group Co., Ltd., Beijing (CN)

(72) Inventors: Guiyu Zhang, Beijing (CN); Xiaojuan Hu, Beijing (CN); Jing Wang, Beijing (CN); Xiaodong Xie, Beijing (CN); Zouming Xu, Beijing (CN); Lei Zhang, Beijing (CN)

(73) Assignees: Hefei Xinsheng Optoelectronics Technology Co., Ltd., Hefei, Anhhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/339,447

(22) PCT Filed: Jun. 11, 2018

(86) PCT No.: PCT/CN2018/090604
§ 371 (c)(1),
(2) Date: Apr. 4, 2019

(87) PCT Pub. No.: WO2019/047580
PCT Pub. Date: Mar. 14, 2019

(65) Prior Publication Data
US 2019/0243486 A1 Aug. 8, 2019

(30) Foreign Application Priority Data
Sep. 5, 2017 (CN) .......................... 2017 1 0791475

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 3/0412* (2013.01);
(Continued)

(58) Field of Classification Search
None
See application file for complete search history.

(56) References Cited

U.S. PATENT DOCUMENTS 8,581,123 B2 * 11/2013 Ozeki ..................... G06F 3/044
178/18.06
9,559,152 B2 * 1/2017 Choi .......................... G02F 1/13
(Continued)

FOREIGN PATENT DOCUMENTS

| CN | 102915147 A | 2/2013 |
|----|-------------|--------|
| CN | 202771396 U | 3/2013 |

(Continued)

OTHER PUBLICATIONS

Sep. 18, 2018—(WO) International Search Report and Written Opinion Appn PCT/CN2018/090604 with English Translation.

*Primary Examiner* — Duane N Taylor, Jr.
(74) *Attorney, Agent, or Firm* — Banner & Witcoff, Ltd.

(57) ABSTRACT

A touch substrate, a manufacturing method thereof and a display panel are provided. The touch substrate includes: a base, including a touch region and a lead region positioned around the touch region; a plurality of first electrode strips, arranged side by side on the base in the touch region, each of the plurality of first electrode strips including a plurality of first sub-electrodes arranged at intervals; and a plurality of conductive bridges, arranged on the base in the touch region, two adjacent first sub-electrodes in each of the
(Continued)

plurality of first electrode strips being electrically connected by one of the plurality of conductive bridges, wherein each of the plurality of conductive bridges includes a main body portion and a branch portion which are directly connected with each other, and at least two branch portions are arranged at least one end of the main body portion.

20 Claims, 8 Drawing Sheets

(52) U.S. Cl.
CPC ........... *G06F 2203/04102* (2013.01); *G06F 2203/04103* (2013.01); *G06F 2203/04111* (2013.01)

(56) References Cited

U.S. PATENT DOCUMENTS

| | | | |
|---|---|---|---|
| 10,473,964 B2* | 11/2019 | Song | G02F 1/13439 |
| 2012/0081333 A1* | 4/2012 | Ozeki | G06F 3/044 345/174 |

FOREIGN PATENT DOCUMENTS

| | | |
|---|---|---|
| CN | 203204585 U | 9/2013 |
| CN | 204613923 U | 9/2015 |
| JP | 2010231288 A | 10/2010 |

* cited by examiner

TOUCH SUBSTRATE AND PREPARATION METHOD THEREFOR, AND DISPLAY PANEL

The application is a U.S. National Phase Entry of International Application No. PCT/CN2018/090604 filed on Jun. 11, 2018, designating the United States of America and claiming priority to Chinese Patent Application No. 201710791475.0, filed on Sep. 5, 2017. The present application claims priority to and the benefit of the above-identified applications and the above-identified applications are incorporated by reference herein in their entirety.

TECHNICAL FIELD

At least one embodiment of the present disclosure relates to a touch substrate and a manufacturing method thereof, and a display panel.

BACKGROUND

An electronic display product with a touch function is more and more favored by customers, and currently, common technologies include a resistive type, a capacitive type, an optical type and the like, wherein a capacitive type touchpad has become the mainstream touch technology used by medium and high-end consumer electronic products currently due to characteristics of high accuracy, multipoint touch, high durability, high touch resolution and the like.

In the field of flexible display, multiple bends may cause damage to components in the electronic display product and affect an electrical function of the electronic display product.

SUMMARY

At least one embodiment of the present disclosure provides a touch substrate, comprising: a base, including a touch region and a lead region positioned around the touch region; a plurality of first electrode strips, arranged side by side on the base in the touch region, each of the plurality of first electrode strips including a plurality of first sub-electrodes arranged at intervals; and a plurality of conductive bridges, arranged on the base in the touch region, any two adjacent first sub-electrodes in each of the plurality of first electrode strips being electrically connected by one of the plurality of conductive bridges, wherein each of the plurality of conductive bridges includes a main body portion and a branch portion which are directly connected with each other, and at least two branch portions are arranged at at least one end of the main body portion.

For example, the touch substrate provided by at least one embodiment of the present disclosure further comprises: a plurality of second electrode strips, arranged side by side on the base in the touch region, the plurality of second electrode strips and the plurality of first electrode strips being arranged in an identical layer, moreover, an extension line where the first electrode strip is positioned intersects with an extension line where the second electrode strip is positioned, and each of the plurality of second electrode strips including a plurality of second sub-electrodes arranged at intervals and a connecting portion for connecting the adjacent second sub-electrodes, wherein in a direction perpendicular to a plane where the base is positioned, the connecting portion is overlapped with at least one portion of the main body portion of the conductive bridge.

For example, in the touch substrate provided by at least one embodiment of the present disclosure, at least one portion of the main body portion and the branch portion of each of the plurality of conductive bridges are arranged in different layers, and in the direction perpendicular to the plane where the base is positioned, the branch portion directly contacts with the first sub-electrode a portion of which is overlapped with the branch portion, so that the branch portion is connected with the first sub-electrode.

For example, in the touch substrate provided by at least one embodiment of the present disclosure, the branch portion is entirely in contact with the first sub-electrode corresponding to the branch portion.

For example, the touch substrate provided by at least one embodiment of the present disclosure further comprises: an insulating layer, arranged between the connecting portions of the plurality of second electrode strips and the plurality of conductive bridges, wherein the insulating layer includes a plurality of sub insulating layers spaced from each other, the sub insulating layers are arranged to correspond to the conductive bridges in a one-to-one correspondence, and at least one portion of an orthogonal projection of the main body portion on the base is positioned within an orthogonal projection of the sub insulating layer on the base, and an orthogonal projection of the branch portion on the base is positioned outside the orthogonal projection of the sub insulating layer on the base.

For example, in the touch substrate provided by at least one embodiment of the present disclosure, an edge contacting with the conductive bridge of a surface of the sub insulating layer, which is parallel to the plane where the base is positioned and is away from the connecting portion, is of an arc shape.

For example, in the touch substrate provided by at least one embodiment of the present disclosure, in a plane parallel to the plane where the base is positioned, a planar shape of the sub insulating layer is circular or oval.

For example, in the touch substrate provided by at least one embodiment of the present disclosure, the main body portion and the branch portion of each of the plurality of conductive bridges are arranged in an identical layer.

For example, the touch substrate provided by at least one embodiment of the present disclosure further comprises: an insulating layer, arranged between the connecting portions of the plurality of second electrode strips and the plurality of conductive bridges, a via hole being disposed in the insulating layer, wherein the first sub-electrode is electrically connected with the conductive bridge through the via hole.

For example, in the touch substrate provided by at least one embodiment of the present disclosure, in a plane parallel to a plane where the base is positioned, an edge of the branch portion is of an arc shape.

For example, in the touch substrate provided by at least one embodiment of the present disclosure, at an identical end of the main body portion, an included angle between two adjacent branch portions is 30 degrees to 60 degrees.

For example, in the touch substrate provided by at least one embodiment of the present disclosure, at an identical end of the main body portion, at least two branch portions are arranged axially symmetrically with respect to an extension line of the main body portion.

For example, in the touch substrate provided by at least one embodiment of the present disclosure, the main body portion includes at least two conductive strips arranged side by side at intervals, and at least one branch portion is arranged at one end of each of the at least two conductive strips.

For example, in the touch substrate provided by at least one embodiment of the present disclosure, the conductive bridge is arranged on a side of the first electrode strip, which is close to the base; or the conductive bridge is arranged on a side of the first electrode strip, which is away from the base.

At least one embodiment of the present disclosure provides a display panel, comprising the touch substrate as mentioned above.

At least one embodiment of the present disclosure provides a manufacturing method of a touch substrate, comprising: providing a base, the base including a touch region and a lead region positioned around the touch region; forming a plurality of first electrode strips arranged side by side on the base in the touch region; and forming a plurality of conductive bridges on the base in the touch region, wherein each of the plurality of first electrode strips includes a plurality of first sub-electrodes arranged at intervals, any two adjacent first sub-electrodes in each of the plurality of first electrode strips are electrically connected by one of the plurality of conductive bridges, each of the plurality of conductive bridges includes a main body portion and a branch portion which are directly connected with each other, and at least two branch portions are arranged at at least one end of the main body portion.

For example, the manufacturing method provided by at least one embodiment of the present disclosure further comprises: forming a plurality of second electrode strips arranged side by side on the base in the touch region, wherein the second electrode strips and the first electrode strips are arranged in an identical layer and are intersected with each other, each of the plurality of second electrode strips includes a plurality of second sub-electrodes arranged at intervals and a connecting portion for connecting the adjacent second sub-electrodes, and in a direction perpendicular to a plane where the base is positioned, the connecting portion is partially overlapped with the main body portion.

For example, in the manufacturing method provided by at least one embodiment of the present disclosure, at least one portion of the main body portion and the branch portion of each of the plurality of conductive bridges are arranged in different layers, and forming the plurality of conductive bridges on the base in the touch region includes: depositing an insulating material film on the base and patterning the insulating material film to form an insulating layer including a plurality of sub insulating layers; and depositing a conductive material film on the base on which the insulating layer is formed and patterning the conductive material film to form the plurality of conductive bridges, the sub insulating layers and the plurality of conductive bridges being arranged in a one-to-one correspondence, wherein corrosion resistance of a preparation material of the conductive bridge is smaller than corrosion resistance of preparation materials of the second electrode strip and the first electrode strip, and in a direction perpendicular to a plane where the base is positioned, at least one portion of an orthogonal projection of the main body portion on the base is positioned within an orthogonal projection of the sub insulating layer on the base, and an orthogonal projection of the branch portion on the base is positioned outside the orthogonal projection of the sub insulating layer on the base.

For example, in the manufacturing method provided by at least one embodiment of the present disclosure, at least one portion of the main body portion and the branch portion of each of the plurality of conductive bridge are arranged in different layers, and forming the plurality of conductive bridges on the base in the touch region includes: depositing an insulating material film on the base and patterning the insulating material film to form an insulating layer including a plurality of sub insulating layers; and providing a first mask, and depositing a conductive material on the base by using the first mask to form the plurality of conductive bridges, the sub insulating layers and the plurality of conductive bridges being arranged in a one-to-one correspondence, wherein in a direction perpendicular to a plane where the base is positioned, at least one portion of an orthogonal projection of the main body portion on the base is positioned within an orthogonal projection of the sub insulating layer on the base, and an orthogonal projection of the branch portion on the base is positioned outside the orthogonal projection of the sub insulating layer on the base.

For example, in the manufacturing method provided by at least one embodiment of the present disclosure, the main body portion and the branch portion of each of the plurality of conductive bridge are arranged in an identical layer, and forming the plurality of conductive bridges on the base in the touch region includes: depositing an insulating material film on the base on which the plurality of first electrode strips are formed to form an insulating layer; patterning the insulating layer to form a via hole in the insulating layer, the via hole exposing a portion of a region of the first sub-electrode; and depositing a conductive material film on the insulating layer and patterning the conductive material film to form the plurality of conductive bridges, the branch portion of the conductive bridge being electrically connected with the first sub-electrode through the via hole.

For example, in the manufacturing method provided by at least one embodiment of the present disclosure, the main body portion and the branch portion of each of the plurality of conductive bridges are arranged in an identical layer, and forming the plurality of conductive bridges on the base in the touch region includes: depositing a conductive material film on the base and patterning the conductive material film to form the plurality of conductive bridges; depositing an insulating material film on the base on which the plurality of conductive bridges are formed to form an insulating layer; and patterning the insulating layer to form a via hole in the insulating layer, the via hole exposing a portion of a region of the conductive bridge, wherein forming the plurality of first electrode strips arranged side by side on the base in the touch region includes: depositing the conductive material film on the insulating layer and patterning the conductive material film to form the plurality of first electrode strips, any two adjacent first sub-electrodes being electrically connected with the conductive bridge through the via hole.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1A:
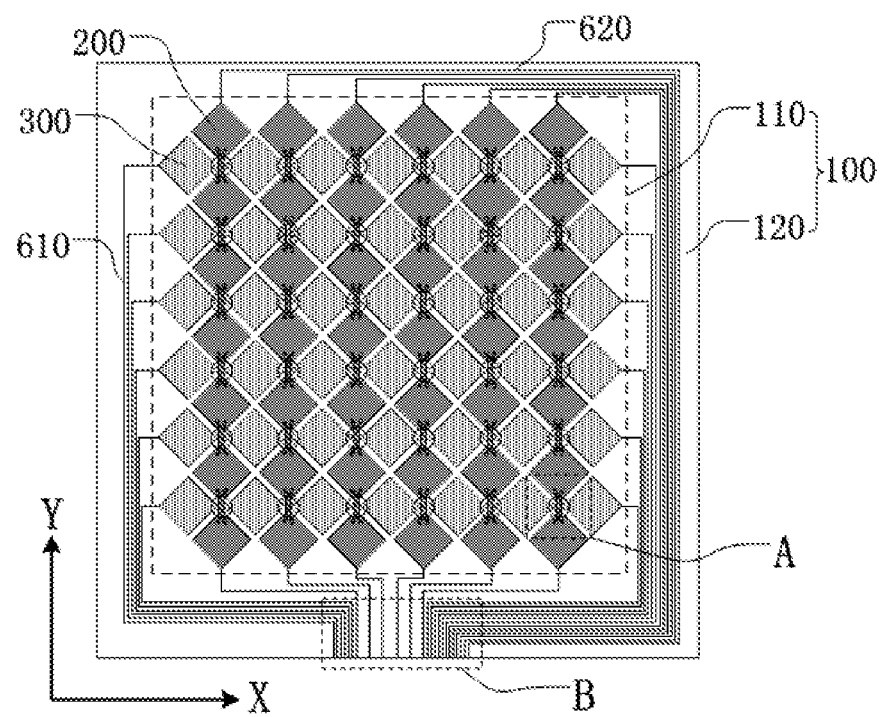
FIG. 1A is a plan view of a touch substrate provided by an embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

At least one embodiment of the present disclosure provides a touch substrate, including: a base, including a touch region and a lead region positioned around the touch region; a plurality of first electrode strips, arranged side by side on the base in the touch region, each first electrode strip including a plurality of first sub-electrodes arranged to space away from each other; and a plurality of conductive bridges, arranged on the base in the touch region, two adjacent first sub-electrodes in each first electrode strip being electrically connected by the conductive bridge, wherein the conductive bridge includes a main body portion and a branch portion, and at least two branch portions are arranged on at least one end of the main body portion. Both ends of the conductive bridge are designed as a structure including at least two branch portions, and when the touch substrate is in a bent state, the branch portion can disperse a stress generated in the conductive bridge and relieve an excessive stress caused by stress centralization on a partial region of the conductive bridge, so that the risk of the conductive bridge being broken is reduced and yield of the touch substrate can be improved.

Hereinafter, a touch substrate and a manufacturing method thereof, and a display panel, as provided by at least one embodiment of the present disclosure, will be illustrated in connection with the drawings.

Figure 1B:
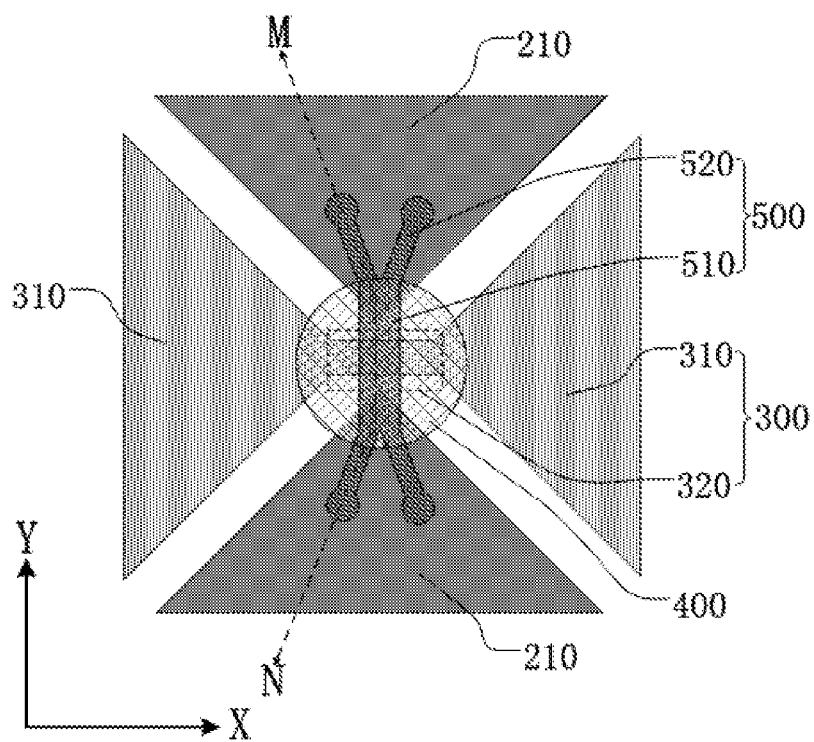
FIG. 1B is a partial structural schematic diagram of a region A of the touch substrate shown in FIG. 1A.
Figure 1C:
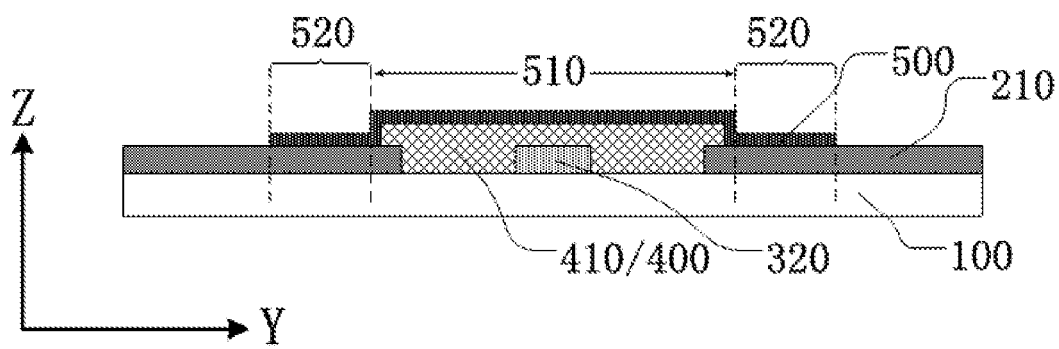
FIG. 1C is a sectional view of the touch substrate shown in FIG. 1B along M-N.
Figure 1D:
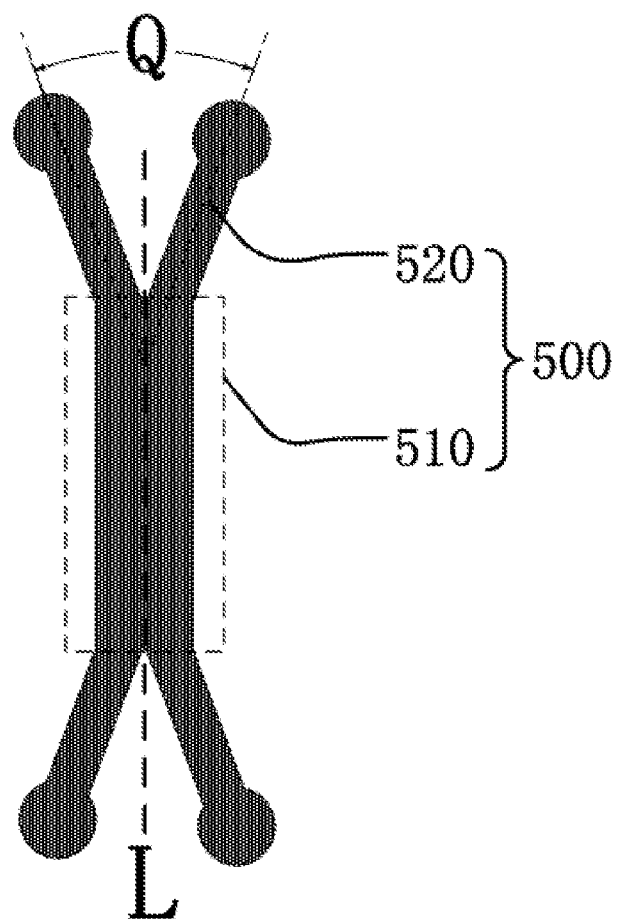
FIG. 1D is a structural schematic diagram of a conductive bridge shown in FIG. 1B.

At least one embodiment of the present disclosure provides a touch substrate, and the touch substrate may be a flexible touch substrate; FIG. 1A is a plan view of a touch substrate provided by one embodiment of the present disclosure, FIG. 1B is a partial structural schematic diagram of a region A of the touch substrate shown in FIG. 1A, FIG. 1C is a sectional view of the touch substrate shown in FIG. 1B along M-N, and FIG. 1D is a structural schematic diagram of a conductive bridge shown in FIG. 1B. For example, as shown in FIG. 1A, FIG. 1B, FIG. 1C and FIG. 1D, the touch substrate includes: a base 100, including a touch region 110 and a lead region 120 positioned around the touch region 110; a plurality of first electrode strips 200, arranged side by side on the base 100 in the touch region 110, each first electrode strip 200 including a plurality of first sub-electrodes 210 arranged at intervals; and a plurality of conductive bridges 500, arranged on the base 100 in the touch region 110, any two adjacent first sub-electrodes 210 in each first electrode strip 200 being electrically connected by one of the conductive bridges 500, each conductive bridge 500 including a main body portion 510 and a branch portion 520, and at least two branch portions 520 being arranged at at least one end of the main body portion 510. For example, the branch portion 520 of the conductive bridge 500 is electrically connected with the first sub-electrode 210. In a case that the conductive bridge 500 is in a bent state, the branch portion 520 can disperse the stress generated in the conductive bridge 500, so that the risk of the conductive bridge 500 being broken is reduced.

For example, in at least one embodiment of the present disclosure, as shown in FIG. 1A, FIG. 1B, FIG. 1C and FIG. 1D, the branch portions 520 may be arranged at both ends of the main body portion 510 of the conductive bridge 500. The branch portion 520 is in contact with the first sub-electrode 210, and when the touch substrate is bent, the bending stress generated in the conductive bridge 500 can be transferred to the branch portion 520 to disperse the stress generated in the conductive bridge 500 so as to prevent the conducive bridge 500 from being broken due to stress centralization.

For example, in at least one embodiment of the present disclosure, as shown in FIG. 1A, FIG. 1B, FIG. 1C and FIG. 1D, the touch substrate further includes a plurality of second electrode strips 300 arranged side by side on the base 100 in the touch region 110, extension lines where the second electrode strips 300 are positioned intersect with extension lines where the first electrode strips 200 are positioned, each second electrode strip 300 includes a plurality of second sub-electrodes 310 arranged at intervals and a connecting portion 320 for connecting the adjacent second sub-electrodes 300, and in a direction perpendicular to the plane where the base 100 is positioned, the connecting portion 320 is overlapped with at least one portion of the main body portion 510 of the conductive bridge 500.

In at least one embodiment of the present disclosure, types of the first electrode strip and the second electrode strip are not limited. For example, one of the first electrode strip and the second electrode strip 300 may be a drive electrode, and the other one of the first electrode strip and the second electrode strip 300 may be a sense electrode. A capacitor may be formed between the first sub-electrode in the first electrode strip and the second sub-electrode in the second electrode strip adjacent to the first electrode strip, and when a foreign object is close to a position where a contact point is positioned for example, capacitance between the first sub-electrode and the second sub-electrode in the corresponding region can be changed, so that the contact point can be positioned by detecting the position of the corresponding capacitor of which the capacitance is changed.

In at least one embodiment of the present disclosure, the arrangement order of the first electrode strip and the second electrode strip in the direction perpendicular to the plane where the base is positioned is not limited, as long as the capacitor can be formed between the adjacent first sub-electrode and second sub-electrode. For example, in at least one embodiment of the present disclosure, as shown in FIG. 1C, the first electrode strip 200 and the second electrode strip 300 may be arranged in the same layer. For example, the first electrode strip 200 and the second electrode strip 300 are the same in preparation material, so that the first electrode strip 200 and the second electrode strip 300 can be synchronously manufactured on the base 100, thereby simplifying the manufacturing process flow of the touch substrate and reducing cost.

In at least one embodiment of the present disclosure, arrangement of each first electrode strip 200 and arrangement of each second electrode strip 300 are not limited, and arrangements of the first electrode strip 200 and the second electrode strip 300 can be set according to actual demands, such as the planar shape and the like of the touch substrate, as long as the extension line where each first electrode strip 200 is positioned can intersect with the extension line where each second electrode strip 300 is positioned. For example, in at least one embodiment of the present disclosure, the first electrode strips 200 are arranged in parallel to each other along a first direction parallel to the base 100 and at intervals; and the second electrode strips 300 are arranged in parallel to each other along a second direction parallel to the base 100 and at intervals, the first direction intersects with the second direction, and the first electrode strip 200 is disconnected at the intersection with the second electrode strip 300, i.e., a plurality of second electrode strips 300 separate the first electrode strip 200 into a plurality of first sub-electrodes 210. For example, the first direction is perpendicular to the second direction.

Hereinafter, by taking a case that the first direction is perpendicular to the second direction, the first electrode strips are arranged at intervals along the first direction and the second electrode strips are arranged at intervals along the second direction as an example, the technical solution of at least one embodiment of the present disclosure as follows will be illustrated.

For example, as shown in FIG. 1A, FIG. 1B, FIG. 1C and FIG. 1D, the base 100 in the touch substrate is referred to and a three-dimensional coordinate system is established so as to carry out directional designation on each component in the touch substrate. In the above-mentioned three-dimensional coordinate system, directions of an X axis and a Y axis are directions parallel to the plane where the base 100 is positioned, the direction of the X axis is the same with the second direction, and the direction of the Y axis is the same with the first direction, i.e., the first electrode strips 200 are arranged side by side along the direction of the Y axis, and the second electrode strips 300 are arranged side by side along the direction of the X axis; and a Z axis is in a direction perpendicular to the plane where the base 100 is positioned.

In at least one embodiment of the present disclosure, a structure of the conductive bridge is not limited, as long as at least two branch portions are arranged at at least one end of the main body portion of the conductive bridge.

For example, in at least one embodiment of the present disclosure, as shown in FIG. 1A, FIG. 1B, FIG. 1C and FIG. 1D, at least two branch portions 520 are respectively arranged at both ends of the main body portion 510 of the conductive bridge 500.

For example, in at least one embodiment of the present disclosure, as shown in FIG. 1D, at the same end of the main body portion 510, at least two branch portions 520 are arranged axially symmetrically with respect to an extension line L (for example, a direction parallel to the Y axis) of the main body portion 510. Therefore, when the touch substrate is in the bent state, a stress difference between the branch portions 520 positioned at the same end of the main body portion 510 can be reduced so as to avoid the excessive partial stress of the conductive bridge 500.

For example, in at least one embodiment of the present disclosure, as shown in FIG. 1D, at the same end of the main body portion 510, an included angle between two adjacent branch portions 520 may be about 30 degrees to 60 degrees, and for example, further may be 35 degrees, 45 degrees, 50 degrees and the like. The included angle between the adjacent branch portions 520 is not limited to the above-mentioned range and may be set according to actual demands, and the embodiments of the present disclosure do not make any limit herein, as long as the branch portions 520 can be connected with the first sub-electrode 210.

Figure 2A:
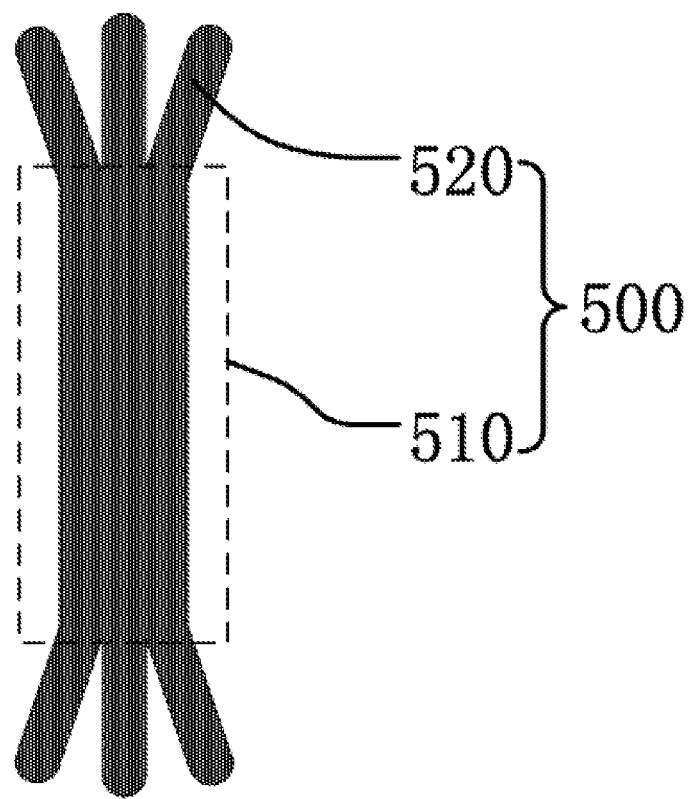
FIG. 2A is another structural schematic diagram of the conductive bridge of the touch substrate provided by an embodiment of the present disclosure.

For example, in at least one embodiment of the present disclosure, the number of the branch portions 520 arranged at the same end of the main body portion 510 of the conductive bridge 500 is not limited, and the number of the branch portions 520 at the same end of the main body portion 510 is not limited to two as shown in FIG. 1D. FIG. 2A is another structural schematic diagram of the conductive bridge of the touch substrate provided by one embodiment of the present disclosure. For example, as shown in FIG. 2A, at least three branch portions 520 may be arranged at the same end of the main body portion 510 of the conductive bridge 500. A plurality of branch portions 520 are spaced from each other and may be respectively connected with the first sub-electrodes 210 of the first electrode strip 200, so that multipoint connection between the conductive bridge 500 and the first sub-electrodes 210 can be implemented, and firmness of connection between the conductive bridge 500 and the first sub-electrodes 210 is improved; moreover, a part of stress generated in the conductive bridge 500 can be shared by more branch portions 520 so as to further reduce the problem of stress centralization; and when one branch portion 520 is disconnected, other branch portions 520 still can connect the conductive bridge 500 and the first sub-electrodes 210, which reduces the risk of damage to the circuit of the touch substrate.

For example, in at least one embodiment of the present disclosure, as shown in FIG. 2A, at the same end of the main body portion 510 of the conductive bridge 500, a plurality of branch portions 520 may be distributed in a sector shape to increase a distribution area of the branch portions 520, so that a contact area between the branch portion 520 and the first sub-electrode 210 is increased, and firmness of connection between the branch portion 520 and the first sub-electrode 210 is improved. For example, widths of the plurality of branch portions 520 may be set to be greater than a width of the main body portion 510, so that a sectional area of a current transmission channel in a region of the conductive bridge 500, where the branch portions 520 are arranged, can be increased, and total resistance of the conductive bridge 500 can be reduced.

For example, in a section parallel to the base 100, an edge of the branch portion 520 may have a rounded profile, and for example, is of an arc or circular shape and the like, so that an edge stress can be further improved, and bending resistance can be further improved.

Figure 2B:
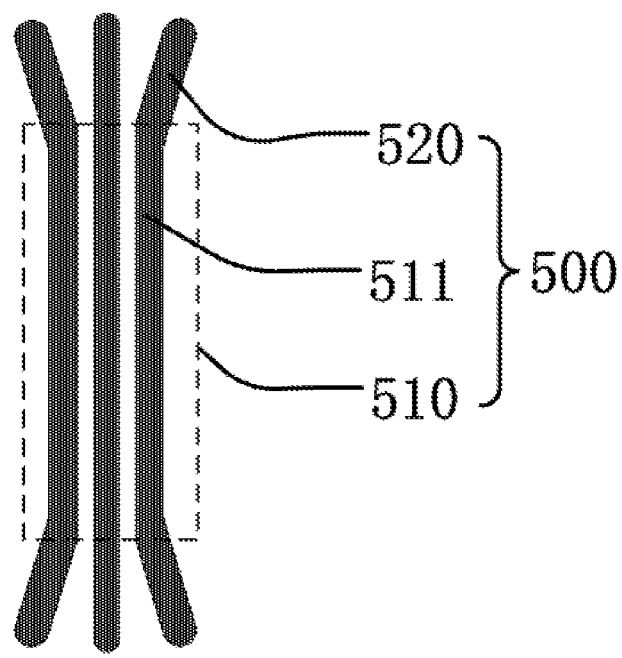
FIG. 2B is yet another structural schematic diagram of the conductive bridge of the touch substrate provided by an embodiment of the present disclosure.

For example, in at least one embodiment of the present disclosure, FIG. 2B is a yet another structural schematic diagram of the conductive bridge of the touch substrate provided by one embodiment of the present disclosure. For example, as shown in FIG. 2B, the main body portion 510 of the conductive bridge 500 includes at least two conductive strips 511 arranged side by side, and at least one branch portion 520 is arranged at at least one end of each conductive strip 511, i.e., the main body portion 510 of the conductive bridge 500 may be set to be of a grid structure. When the touch substrate is in the bent state, the conductive strips 511 are spaced from each other, and thus, a stress generated in each conductive strip 511 cannot be transferred mutually, and a stress generated in the main body portion 510 can be dispersed in each conductive strip 511, so that the excessive partial stress of the main body portion 510 can be avoided, and bending resistance of the conductive bridge 500 and even the touch substrate is further promoted. Moreover, the main body portion 510 with the above-mentioned grid structure can improve transmittance of light and promote a display effect of a display image of an electronic display product (for example, a display panel in the embodiment described below).

For example, in at least one embodiment of the present disclosure, as shown in FIG. 1A, the touch substrate further may include a plurality of first signal lines 620 and a plurality of second signal lines 610, which are arranged on the base 100 in the lead region 120, wherein the first signal lines 610 are connected with the first electrode strips 200 in a one-to-one correspondence, and the second signal lines 620 are connected with the second electrode strips 300 in a one-to-one correspondence. In at least one embodiment of the present disclosure, distribution of the first signal line 610 and the second signal line 620 on the base is not limited, and may be designed according to actual process conditions. For example, as shown in FIG. 1A, the first signal line 610 and the second signal line 620 may be converged to a port region B so as to be electrically connected with an external control unit, such as a driver chip and the like.

For example, in at least one embodiment of the present disclosure, as shown in FIG. 1A to FIG. 1D, the touch substrate further may include an insulating layer 400 arranged between the conductive bridge 500 and the connecting portion 320 of the second electrode strip 300. The insulating layer 400 is filled between the conductive bridge 500 and the second electrode strip 300 to prevent electrical connection between the conductive bridge 500 and the second electrode strip 300. Arrangement of the insulating layer 400 needs to ensure electrical connection between the conductive bridge 500 and the first electrode strip 200 and block electrical connection between the conductive bridge 500 and the second electrode strip 300, and thus, according to different arrangement positions of the first electrode strip 200, the second electrode strip 300 and the conductive bridge 500 on the base 100, there may be various arrangement modes of the insulating layer 400.

In some embodiments of the present disclosure, the main body portion and the branch portion of the conductive bridge may be arranged in the same layer; and in some another embodiments of the present disclosure, at least one portion of the main body portion and the branch portion of the conductive bridge are positioned in different layers. The insulating layer spaces the conductive bridge from the connecting portion, and thus, positions of the main body portion and the branch portion of the conductive bridge are affected with a shape and an arrangement position of the insulating layer, and hereinafter, different arrangement modes of the main body portion and the branch portion will be respectively illustrated.

In at least one embodiment of the present disclosure, as shown in FIG. 1C, in the direction of the Z axis, at least one portion of the main body portion 510 and the branch portion 520 of each conductive bridge 500 are arranged in different layers, and in the direction perpendicular to the plane where the base 100 is positioned, each branch portion 520 is in direct contact with the first sub-electrode 210 partially overlapped therewith to implement electrical connection. In the direction of the Z axis, a portion of the branch portion 520, which is not positioned on the same layer with the main body portion 510, may be in total or partial contact with the first sub-electrode 210 and is not overlapped with the insulating layer 400, and thus, the insulating layer 400 needs to be patterned so as to enable the conductive bridge 500 to meet the above-mentioned structural requirements.

For example, in at least one embodiment of the present disclosure, as shown in FIG. 1A to FIG. 1D, the insulating layer 400 includes a plurality of sub insulating layers 410 spaced from each other, the sub insulating layers 410 are arranged to correspond to the conductive bridges 500 in a one-to-one correspondence, and in the direction (for example, a direction parallel to the Z axis) perpendicular to the plane where the base 100 is positioned, an orthogonal projection of the main body portion 510 of the conductive bridge 500 on the base 100 is at least partially positioned in an orthogonal projection of the sub insulating layer on the base 100, and an orthogonal projection of the branch portion 520 on the base 100 is at least partially positioned outside the orthogonal projection of the sub insulating layer 410 on the base 100. In the touch substrate with the above-mentioned structure, a portion of the branch portion 520 of the conductive bridge 500, which is not overlapped with the sub insulating layer 410, may be in contact with the first sub-electrode 210 of the first electrode strip 200, so that the contact area between the conductive bridge 500 and the first sub-electrode 210 can be increased, and connection between the conductive bridge 500 and the first sub-electrode 210 can be reinforced.

In at least one embodiment of the present disclosure, a distribution region of the branch portion in the conductive bridge is not limited. The branch portion is not limited to a case shown in FIG. 1C that a portion of the branch portion is in contact with the first sub-electrode, and for example, in at least one embodiment of the present disclosure, the entire branch portion may be in contact with the first sub-electrode, so that firmness of connection between the branch portion and the first sub-electrode can be improved.

For example, in at least one embodiment of the present disclosure, as shown in FIG. 1A to FIG. 1D, a surface of the sub insulating layer 410, which is parallel to the plane where the base 100 is positioned and is away from the connecting portion 320, has an edge, in contact with the conductive bridge 500, of an arc shape. For example, in a section of the insulating layer 400, which is parallel to the base 100, an edge of the insulating layer 400 is of an arc shape. For example, in the section parallel to the base 100, a cross-sectional shape of a portion in contact with the conductive bridge 500 is arc or circular. When the touch substrate is in the bent state, at the arc edge of the sub insulating layer 410, the section applying stresses to each other between the sub insulating layer 410 and the branch portion 520 is of an arc shape, so that the stresses can be uniformly distributed at the arc edge, thereby reducing the risk of the conductive bridge 500 being broken due to stress centralization.

For example, in at least one embodiment of the present disclosure, the section shape of the insulating layer 400 (for example, the shape of a section parallel to the plane where the base 100 is positioned) is arc or circular, so that the edge stress can be further improved, and bending resistance of the touch substrate is improved.

In at least one embodiment of the present disclosure, the planar shape of the sub insulating layer is not limited, as long as the edge of the sub insulating layer, which is in contact with the branch portion, is of an arc shape. For example, in at least one embodiment of the present disclosure, as shown in FIG. 1A to FIG. 1D, in a plane parallel to the plane where the base 100 is positioned, the planar shape of the sub insulating layer 410 is circular or oval and the like.

It should be noted that in at least one embodiment of the present disclosure, at least one portion of the main body portion and the branch portion of each conductive bridge are arranged in different layers, which represents a case that the main body portion and the branch portion of the conductive bridge are not totally positioned on the same layer, and distribution of the main body portion and the branch portion of the conductive bridge on the base is also not limited to that shown in FIG. 1C. For example, the main body portion of the conductive bridge may be totally positioned in the same layer, i.e., the orthogonal projection of the main body portion on the base may be totally positioned in the orthogonal projection of the sub insulating layer on the base; and the branch portion may be distributed in different layers, and for example, the branch portion may be partially arranged on a surface of the sub insulating layer, which is away from the base, partially arranged on a side surface of the sub insulating layer, which is perpendicular to the plane where the base is positioned, and partially arranged on the first sub-electrode.

Figure 3A:
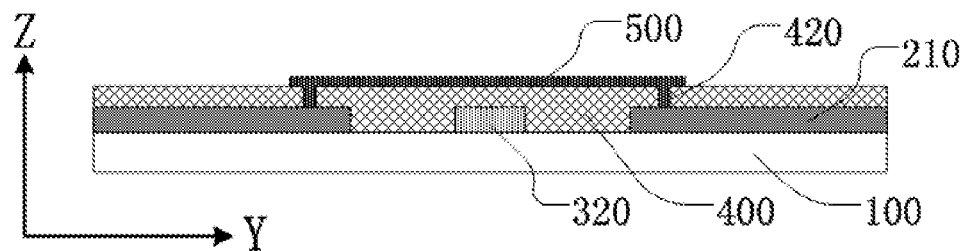
FIG. 3A is a partial sectional view of another touch substrate provided by an embodiment of the present disclosure.

In at least one embodiment of the present disclosure, FIG. 3A is a partial sectional view of another touch substrate provided by one embodiment of the present disclosure. As shown in FIG. 3A, the main body portion 510 and the branch portion 520 of each conductive bridge 500 may be arranged in the same layer. The arrangement mode of the same-layer structure of the main body portion 510 and the branch portion 520 can improve firmness of the structure of the conductive bridge 500, and can reduce the risk of the conductive bridge 500 being broken in the bending process.

Figure 3B:
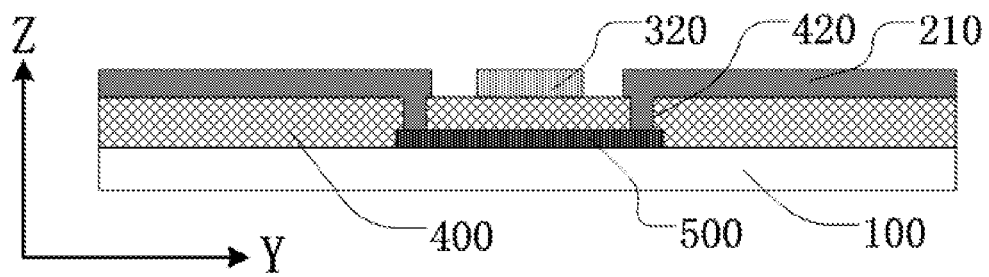
FIG. 3B is a partial sectional view of yet another touch substrate provided by an embodiment of the present disclosure.

For example, in at least one embodiment of the present disclosure, as shown in FIG. 3A and FIG. 3B, in the direction (for example, the direction parallel to the Z axis) perpendicular to the plane where the base 100 is positioned, the insulating layer 400 is configured to cover the entire surface of the base 100, a via hole 420 is disposed in the insulating layer 400, and the first sub-electrode 210 of the first electrode strip 200 is electrically connected with the branch portion 520 or the main body portion 510 of the conductive bridge 500 through the via hole 420. For example, an electrical conductor may be arranged in the via hole 420, and the branch portion 520 and the first sub-electrode 210 are electrically connected by the electrical conductor. For example, the electrical conductor is separately arranged; the electrical conductor may also be formed by the same material with the first sub-electrode 210 or the conductive bridge 500; or the electrical conductor may be integrally formed with the first sub-electrode 210 or the conductive bridge 500.

In at least one embodiment of the present disclosure, a preparation material of the insulating layer is not limited, and for example, the preparation material of the insulating layer is an insulating material and further, for example, is an insulating material with excellent elasticity. For example, the preparation material of the insulating layer may include insulating materials such as oxides of silicon ($SiO_x$), nitride of silicon ($SiN_x$), silicon oxynitride, resin and the like.

In the touch substrate provided by at least one embodiment of the present disclosure, the arrangement relationship of the first electrode strip, the second electrode strip and the conductive bridge in the Y-axis direction is not limited, and may be set according to actual demands.

For example, in at least one embodiment of the present disclosure, as shown in FIG. 3A, the conductive bridge 500 is arranged on one side of the connecting portion 320 of the second electrode strip 300 (the second electrode strip 300, for example, is arranged in the same layer with the first electrode strip 200), which is away from the base 100.

For example, in at least one embodiment of the present disclosure, FIG. 3B is a partial sectional view of yet another touch substrate provided by one embodiment of the present disclosure. For example, as shown in FIG. 3B, the conductive bridge 500 is arranged between the base 100 and the connecting portion 320 of the second electrode strip 300 (the second electrode strip 300, for example, is arranged in the same layer with the first electrode strip 200).

In at least one embodiment of the present disclosure, preparation materials of the first electrode strip, the second electrode strip and the conductive bridge are not limited. For example, the preparation materials of the first electrode strip, the second electrode strip and the conductive bridge may be translucent or transparent conductive materials, such as Indium Tin Oxide (ITO), Indium Zinc Oxide (IZO), Iridium Gallium Oxide (IGO), Gallium Zinc Oxide (GZO), Zinc Oxide (ZnO), Indium Oxide ($In_2O_3$), Aluminum Zinc Oxide (AZO), carbon nanotubes and the like. For example, the conductive bridge 500 may also use conductive materials with good malleability, such as metals of gold (Au), silver (Ag), copper (Au), aluminum (Al) and the like and alloys thereof.

Connection is easy to implement between the same type of materials in the crystallizing process (firmness of connection between the same type of materials is relatively high). For example, in at least one embodiment of the present disclosure, for example, the first electrode strip, the second electrode strip 300 and the conductive bridge may be manufactured from the same type of materials and are similar in crystallization condition (for example, parameters of temperature, pressure and the like) in the forming process so as to facilitate improving firmness of connection among the first electrode strip, the second electrode strip and the conductive bridge. Exemplarily, the preparation materials of the first electrode strip, the second electrode strip and the conductive bridge may be all ITO and the like.

In at least one embodiment of the present disclosure, planar shapes of the first electrode strip, the second electrode strip and the like are not limited, and may be set according to actual demands.

For example, in at least one embodiment of the present disclosure, as shown in FIG. 1A and FIG. 1B, viewing from the direction (for example, the direction parallel to the Z axis) perpendicular to the plane where the base 100 is positioned, the planar shapes of the second sub-electrode 310 and the first sub-electrode 210 are diamond (only one portion of the diamond is shown in FIG. 1B). The first sub-electrode 210 and the second sub-electrode 310 which adopt the above-mentioned structures can increase a sense region of the touch substrate and improve sensitivity of the touch substrate.

Figure 4:
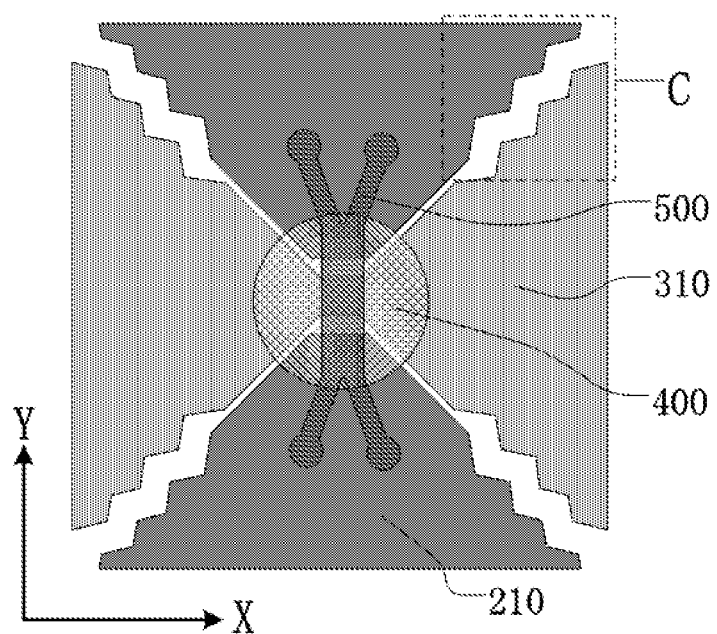
FIG. 4 is a partial structural schematic diagram of still another touch substrate provided by an embodiment of the present disclosure.

For example, in at least one embodiment of the present disclosure, FIG. 4 is a partial structural schematic diagram of still a further touch substrate provided by one embodiment of the present disclosure. For example, as shown in FIG. 4, viewing from the direction parallel to the Z axis, peripheral edges of the first sub-electrode 210 and the second sub-electrode 310 are at least partially set to be of a sawtooth shape. The touch structure adopting the above-mentioned structure has an excellent vanishing image effect, and can improve the display effect of the display image of the electronic display product (including the touch substrate in the embodiments of the present disclosure).

Figure 5:
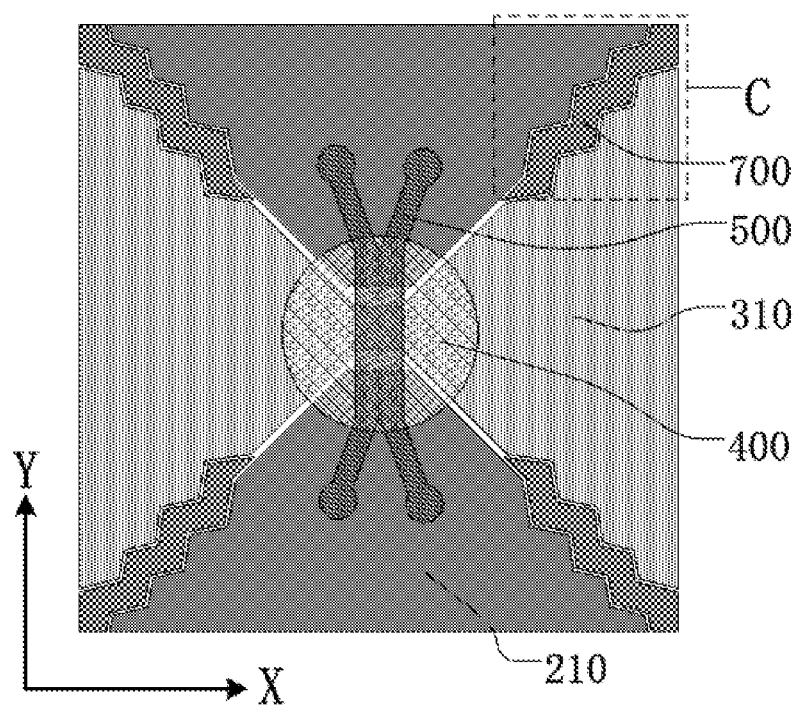
FIG. 5 is a partial structural schematic diagram of still another touch substrate provided by an embodiment of the present disclosure.

For example, in at least one embodiment of the present disclosure, FIG. 5 is a partial structural schematic diagram of another touch substrate provided by one embodiment of the present disclosure. For example, as shown in FIG. 5, a filling electrode 700 may also be arranged between the adjacent first sub-electrode 210 and second sub-electrode 310, and the filling electrode 700 is spaced from the first sub-electrode 210 and the second sub-electrode 310. As shown in FIG. 4, due to a large interval region between the first sub-electrode 210 and the second sub-electrode 310, light transmittance at a position of the interval region is high, resulting in that uneven brightness distribution and the like of the display image may be caused and the display effect may be influenced. The filling electrode 700 may fill the interval region between the first sub-electrode 210 and the second sub-electrode 310, so that evenness of distribution of the light transmittance of the touch substrate can be improved, and the display effect of the display image can be improved. For example, the filling electrode 700 may be manufactured in the same layer and from the same material with the first sub-electrode 210 and the second sub-electrode 310, so as to improve evenness of distribution of the light transmittance of the touch substrate while not increasing any manufacturing process of the touch substrate.

In at least one embodiment of the present disclosure, sizes of the first sub-electrode, the second sub-electrode and the connecting portion thereof and the like in the touch substrate are not limited. For example, the partial structure of the touch substrate in FIG. 5 may be one touch unit, and a size of the touch unit along the direction of the X axis or the direction of the Y axis may be about 3 to 10 millimeters. For example, when the touch substrate is applied to different sizes of electronic display products, according to the sizes of the corresponding electronic products, the sizes of structures such as the first sub-electrode, the second sub-electrode and the connecting portion thereof and the like may be adjusted in an equal proportion, so that a space occupied by a wiring can be reduced, and cost can be reduced.

At least one embodiment of the present disclosure provides a display panel, and the display panel may include the touch substrate in any one of the above-mentioned embodiments.

In at least one embodiment of the present disclosure, an arrangement position of the touch substrate in the display panel is not limited. For example, the touch substrate may be arranged on a side of a display surface of the display panel, and may also be arranged in an embedding mode inside the display panel.

For example, in one example of the embodiments of the present disclosure, the display panel may be a liquid crystal display panel, for example, the liquid crystal display panel may include an array substrate and an opposed substrate, the array substrate and the opposed substrate are arranged opposite to each other to form a liquid crystal cell, and the liquid crystal cell is filled with a liquid crystal material. The opposed substrate, for example, may be a color filter substrate. A pixel electrode and a common electrode of each pixel unit of the array substrate are used for applying an electric field to control the degree of rotation of the liquid crystal material so as to carry out a display operation.

For example, in one example of the embodiments of the present disclosure, the display panel may be an Organic Light-Emitting Diode (OLED) display panel, wherein a lamination of organic light-emitting materials may be formed in a sub-pixel region of the display panel, and the pixel electrode of each sub-pixel unit is used as an anode or a cathode for driving the organic light-emitting material to emit light so as to carry out the display operation.

For example, in one example of the embodiments of the present disclosure, the display panel may be an electronic paper display panel, wherein an electronic ink layer may be formed on a display substrate of the display panel, and the pixel electrode of each sub-pixel unit is used for applying a voltage for driving charged microparticles in electronic ink to move so as to carry out the display operation.

In at least one embodiment of the present disclosure, the display panel may also be any product or component with a display function, such as a mobile phone, a tablet personal computer, a television, a display, a notebook computer, a digital photo frame, a navigator and the like, and may also be matched with other functional devices, such as an active pen, a passive pen and the like.

At least one embodiment of the present disclosure provides a manufacturing method of a touch substrate, including: providing a base, the base including a touch region and a lead region positioned around the touch region; forming a plurality of first electrode strips arranged side by side on the base in the touch region; and forming a plurality of conductive bridges on the base in the touch region, wherein each of the first electrode strips includes a plurality of first sub-electrodes arranged at intervals, any two adjacent first sub-electrodes in each of the first electrode strips are electrically connected by one of the conductive bridges, the conductive bridge includes a main body portion and a branch portion which are directly connected with each other, and at least two branch portions are arranged at at least one end of the main body portion. The branch portion can disperse a stress generated in the conductive bridge, so that when the touch substrate is in a bent state, a partial region of the conductive bridge is prevented from being broken due to the excessive stress.

For example, in at least one embodiment of the present disclosure, the manufacturing method of the touch substrate further may include: forming a plurality of second electrode strips arranged side by side on the base in the touch region, wherein the second electrode strips and the first electrode strips are arranged in the same layer and intersected with each other, each of the second electrode strips includes a plurality of second sub-electrodes arranged at intervals and a connecting portion for connecting the adjacent second sub-electrodes, and in a direction perpendicular to the plane where the base is positioned, the connecting portion is partially overlapped with the main body portion. The first electrode strip intersects with the second electrode strip so as to form a mutual capacitor at the intersection, and by detecting a capacitance variation of each capacitor, a contact point can be positioned so as to achieve a touch function of the touch substrate. For example, a second electrode layer may be manufactured in the same layer with a first electrode layer.

It should be noted that in the manufacturing method of the touch substrate, as provided by at least one embodiment of the present disclosure, according to different design structures and actual process demands of the touch substrate, the manufacturing method of the touch substrate may be different. Hereinafter, in several examples of at least one embodiment of the present disclosure, several manufacturing methods of the touch substrate will be illustrated.

For example, in at least one embodiment of the present disclosure, at least one portion of the main body portion and the branch portion of each of the conductive bridges are formed in different layers. Exemplarily, by taking a case of manufacturing the touch substrate as shown in FIG. 1C as an example, in one example of at least one embodiment of the present disclosure, forming the plurality of conductive bridges 500 on the base 100 in the touch region 110 includes: depositing an insulating material film on the base 100 and patterning the insulating material film to form the insulating layer 400 including a plurality of sub insulating layers 410; and depositing a conductive material film on the base 100 on which the plurality of sub insulating layers 410 are formed and patterning the conductive material film to form the conductive bridges 500, the formed sub insulating layers 410 being arranged corresponding to the conductive bridges 500 one to one, wherein corrosion resistance of a preparation material of the conductive bridge 500 is smaller than corrosion resistance of preparation materials of the first electrode strip 200 and the second electrode strip 300. In the touch substrate manufactured by the manufacturing method provided by embodiments of the present disclosure, distribution of the main body portion 510 and the branch portion 520 of the conductive bridge 500 is not limited, and for example, in the direction perpendicular to the plane where the base is positioned, the orthogonal projection of the main body portion 510 on the base 100 is at least partially positioned within the orthogonal projection of the sub insulating layer 410 on the base 100, and the orthogonal projection of the branch portion 520 on the base 100 is positioned outside the orthogonal projection of the sub insulating layer 410 on the base 100.

The preparation material of the conductive bridge 500 is different from the preparation materials of the first electrode strip 200 and the second electrode strip 300, and in the patterning process, for example, corrosion solution which can corrode the conductive bridge 500, but cannot corrode the first electrode strip 200 and the second electrode strip 300 may be selected; and for example, corrosion resistance of the preparation materials of the first electrode strip 200 and the second electrode strip 300 for the corrosion solution in the patterning process is greater than corrosion resistance of the preparation material of the conductive bridge 500 for the corrosion solution in the patterning process. Exemplarily, the preparation material for the corrosion solution in the patterning process may be ITO, the ITO needs to be corroded, for example, by aqua regia, and is relatively high in corrosion resistance for other corrosion solution, the preparation material of the conductive bridge 500, for example, may be copper (Cu), and the copper material may be etched by ferric trichloride and the like.

For example, in at least one embodiment of the present disclosure, at least one portion of the main body portion and the branch portion of each of the conductive bridges are formed in different layers. Exemplarily, by taking the case of manufacturing the touch substrate as shown in FIG. 1C as the example, in one example of at least one embodiment of the present disclosure, forming the plurality of conductive bridges 500 on the base 100 in the touch region 110 includes: depositing an insulating material film on the base 100 and carrying out a patterning process on the insulating material film to form the insulating layer 400 including a plurality of sub insulating layers 410; and providing a first mask, and depositing a conductive material film on the base 100 by using the first mask to form the plurality of conductive bridges 500, the formed sub insulating layers 410 being arranged corresponding to the conductive bridges 500 one to one. In the touch substrate manufactured by the manufacturing method provided by embodiments of the present disclosure, distribution of the main body portion 510 and the branch portion 520 of the conductive bridge 500 is not limited, and for example, in the direction perpendicular to the plane where the base 100 is positioned, the orthogonal projection of the main body portion 510 on the base 100 is at least partially positioned in the orthogonal projection of the sub insulating layer 410 on the base 100, and the orthogonal projection of the branch portion 520 on the base 100 is positioned outside the orthogonal projection of the sub insulating layer 410 on the base 100.

For example, in at least one embodiment of the present disclosure, the main body portion and the branch portion of each of the conductive bridges are formed in the same layer. For example, by taking a case of manufacturing the touch substrate as shown in FIG. 3A as an example, in another example of at least one embodiment of the present disclosure, forming the plurality of conductive bridges 500 on the base 100 in the touch region 110 includes: depositing an insulating material film on the base 100 on which the first electrode strip 200 is formed to form the insulating layer 400 which may cover the entire touch region for example; carrying out a patterning process on the insulating layer 400 to form a plurality of via holes 420 in the insulating layer 400, the via hole exposing a portion of a region of the first sub-electrode 210 of the first electrode strip 200; and depositing a conductive material film on the insulating layer 400 and carrying out the patterning process on the conductive material film to form the plurality of conductive bridges 500, the branch portion 520 of the conductive bridge 500 being electrically connected with the first sub-electrode 210 through the via hole 420.

For example, in at least one embodiment of the present disclosure, the main body portion and the branch portion of each conductive bridge are formed in the same layer. For example, by taking a case of manufacturing the touch substrate as shown in FIG. 3B as an example, in another example of at least one embodiment of the present disclosure, the forming the plurality of conductive bridges 500 on the base 100 in the touch region 110 includes: depositing a conductive material film on the base 100 and carrying out a patterning process on the conductive material film to form the plurality of conductive bridges 500, and depositing an insulating material film on the base 100 on which the conductive bridges 500 are formed to form the insulating layer 400 which may cover the entire touch region for example; carrying out the patterning process on the insulating layer 400 to form a plurality of via holes 420 in the insulating layer 400, the via hole 420 exposing a portion of a region of the conductive bridge 500 (for example, a portion of a region of the branch portion 520 of the conductive bridge 500); and depositing the conductive material film on the insulating layer 400 and carrying out the patterning process on the conductive material film to form the plurality of first electrode strips 200 (for example, a plurality of second electrode strips 300 arranged side by side may be synchronously formed) which are arranged side by side, the first sub-electrode 210 of the first electrode strip 200 being electrically connected with the conductive bridge 500 through the via hole 420.

The structure of the touch substrate manufactured by the manufacturing method provided by at least one embodiment of the present disclosure may refer to related contents in the above-mentioned embodiments (the embodiments related to the touch substrate), and is not repeated herein.

Hereinafter, in at least one embodiment of the present disclosure, the manufacturing method of the touch substrate will be illustrated, and FIG. 6A to FIG. 6B, FIG. 7, FIG. 8A to FIG. 8B and FIG. 9A to FIG. 9B are process diagrams of a manufacturing method of a touch substrate, as provided by one embodiment of the present disclosure. For example, as shown in FIG. 6A to FIG. 6B, FIG. 7, FIG. 8A to FIG. 8B and FIG. 9A to FIG. 9B, by taking the case of manufacturing the touch substrate as shown in FIG. 1C as the example, the manufacturing method of the touch substrate, as provided by at least one embodiment of the present disclosure, may include the process as follows, wherein at least one portion of the main body portion 510 and the branch portion 520 of each of the conductive bridges 500 are arranged in different layers.

Figure 6A:
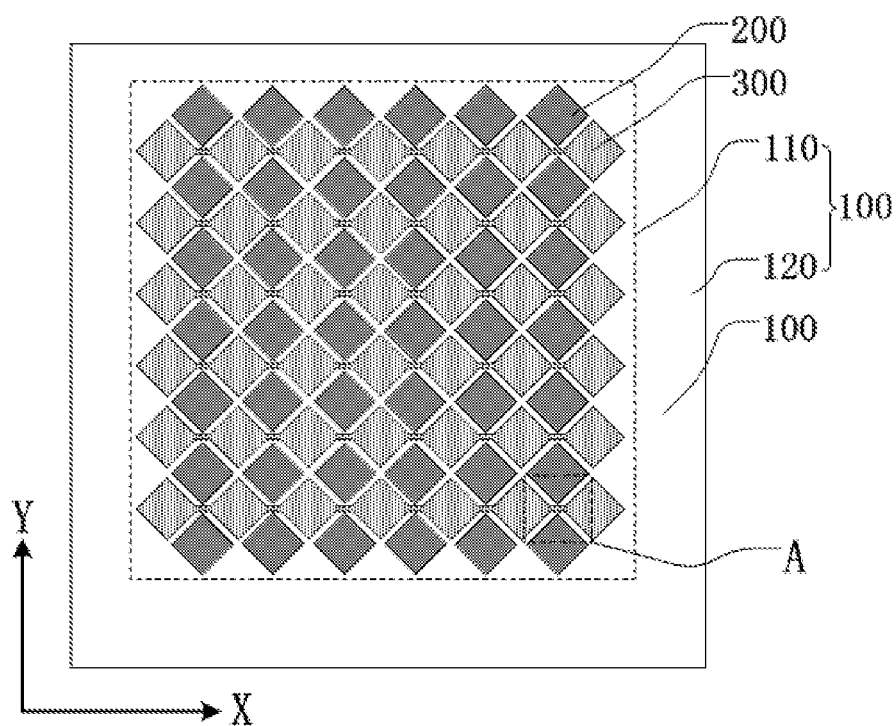
FIG. 6A to FIG. 6B are process diagrams of a manufacturing method of a touch substrate, as provided by one embodiment of the present disclosure.
Figure 6B:
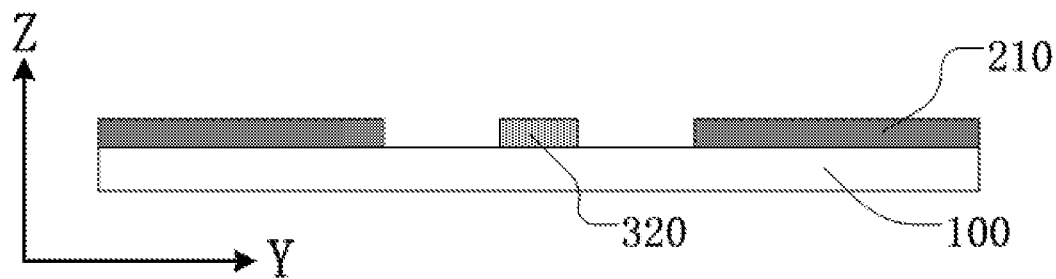

FIG. 6B is a sectional view of a region A shown in FIG. 6A, and as shown in FIG. 6A and FIG. 6B, a base 100 is provided, a conductive material film is deposited on the base 100 and is subjected to a patterning process to form a plurality of first electrode strips 200 arranged side by side and a plurality of second electrode strips 300 arranged side by side, each of the first electrode strips 200 intersects with each of the second electrode strips 300, the base 100 includes a touch region 110 and a lead region 120 positioned around the touch region 110, the first electrode strip 200 and the second electrode strip 300 are formed in the touch region of the base 100, each of the first electrode strips 200 includes a plurality of first sub-electrodes 210 arranged at intervals, and each of the second electrode strips 300 includes a plurality of second sub-electrodes 310 arranged at intervals and a connecting portion 320 for connecting the adjacent second sub-electrodes 310.

A preparation material of the base may be a transparent or translucent flexible material. For example, the preparation material of the base may be a resin material including one or more of polyimide, polycarbonate, polyacrylate, polyetherimide, polyethersulfone, polyethylene terephthalate, polyethylene naphthalate and the like.

For example, in at least one embodiment of the present disclosure, the patterning process may include dry etching or wet etching. For example, the patterning process may include: coating a photoresist layer on a structural layer to be patterned, exposing the photoresist layer by using a mask, developing the exposed photoresist layer to obtain a photoresist pattern, etching the structural layer by using the photoresist pattern as a mask, and then optionally, removing the photoresist pattern.

For example, in at least one embodiment of the present disclosure, in the process of manufacturing the first electrode strip 200 and the second electrode strip 300 as shown in FIG. 6A and FIG. 6B, edges of the first sub-electrode 210 and the second sub-electrode 310 may be formed as a sawtooth shape as shown in FIG. 4 by the patterning process so as to obtain the vanishing image effect.

For example, in at least one embodiment of the present disclosure, in the process of manufacturing the first electrode strip 200 and the second electrode strip 300 as shown in FIG. 6A and FIG. 6B, in a process of patterning the conductive material film to obtain the first sub-electrode 210 and the second sub-electrode 310, the filling electrode 700 shown in FIG. 5 may be synchronously obtained so as to keep evenness of light transmittance of the touch substrate.

Figure 7:
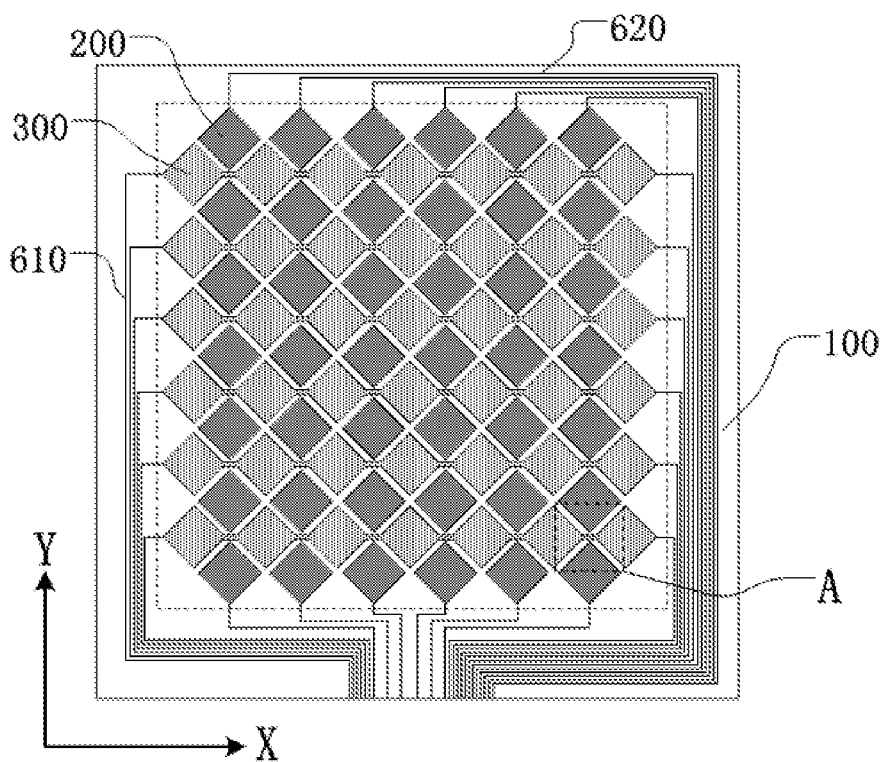
FIG. 7 is another process diagram of a manufacturing method of a touch substrate, as provided by an embodiment of the present disclosure.

As shown in FIG. 7, a first signal line 610 and a second signal line 620 are formed on the base 100 in the lead region 120, the first signal line 610 is electrically connected with the first electrode strip 200, and the second signal line 620 is electrically connected with the second electrode strip 300. It should be noted that embodiments of the present disclosure do not make any limit to forming manners of the first signal line 610 and the second signal line 620 and an order of the first signal line 610 and the second signal line 620 in the entire manufacturing process steps, as long as the signal line can be connected with the corresponding electrode strip. For example, in a process of manufacturing the first electrode strip 200 and the second electrode strip 300, a patterning process may be carried out on the conductive material film so as to simultaneously form the first electrode strip 200, the second electrode strip 300, the first signal line 610 and the second signal line 620; and for example, the first signal line 610 and the second signal line 620 may be firstly formed and then the first electrode strip 200 and the second electrode strip 300 are formed, or the first electrode strip 200 and the second electrode strip 300 may be firstly formed and then the first signal line 610 and the second signal line 620 are formed.

In at least one embodiment of the present disclosure, preparation materials of the first signal line 610 and the second signal line 620 are not limited. For example, the preparation materials of the first signal line 610 and the second signal line 620 may be conductive materials with excellent flexibility, such as metals of copper, aluminum, silver or gold and the like or metal alloys and the like.

Figure 8A:
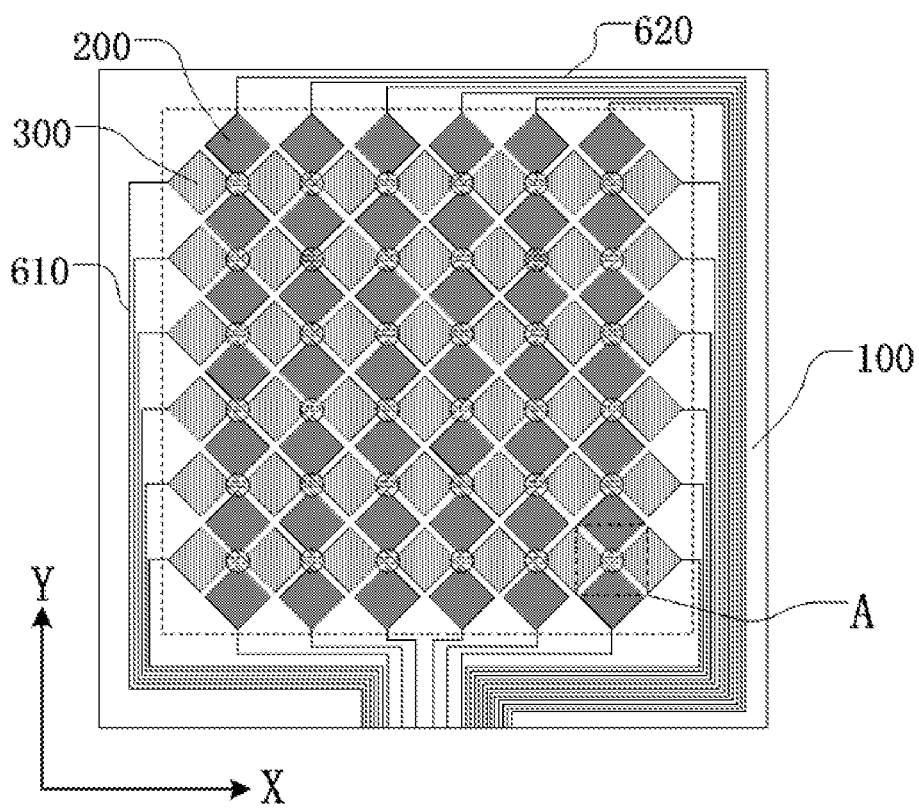
FIG. 8A to FIG. 8B are yet another process diagrams of a manufacturing method of a touch substrate, as provided by one embodiment of the present disclosure.
Figure 8B:
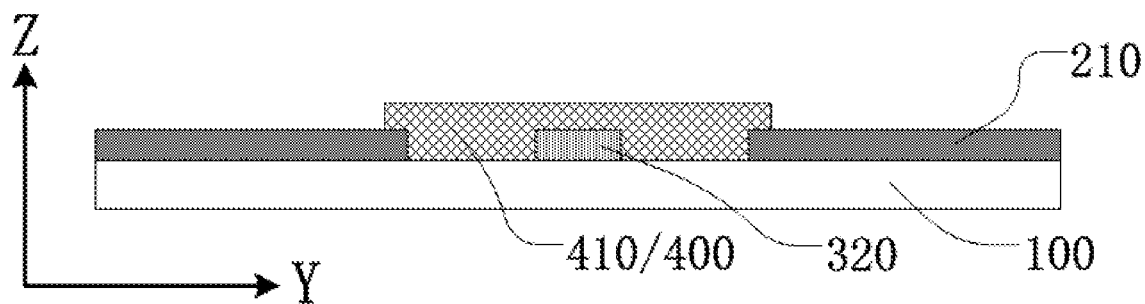

FIG. 8B is a sectional view of a region A shown in FIG. 8A, and as shown in FIG. 8A and FIG. 8B, the insulating material film is deposited on the base 100 on which the first electrode strip 200 and the second electrode strip 300 are formed and is subjected to a patterning process to form the insulating layer 400 including a plurality of sub insulating layers 410 spaced from each other, the sub insulating layer 410 is formed at an intersection position of the first electrode strip 200 and the second electrode strip 300, and in a direction of the Z axis, the sub insulating layer 410 is partially overlapped with the connecting portion 320. For example, in a direction along the Y axis, the sub insulating layer 410 covers the entire connecting portion 320. The structure of the sub insulating layer 410 may refer to related illustration in the above-mentioned embodiments (the embodiments related to the touch substrate), and the embodiments of the present disclosure will not repeat it herein.

Figure 9A:
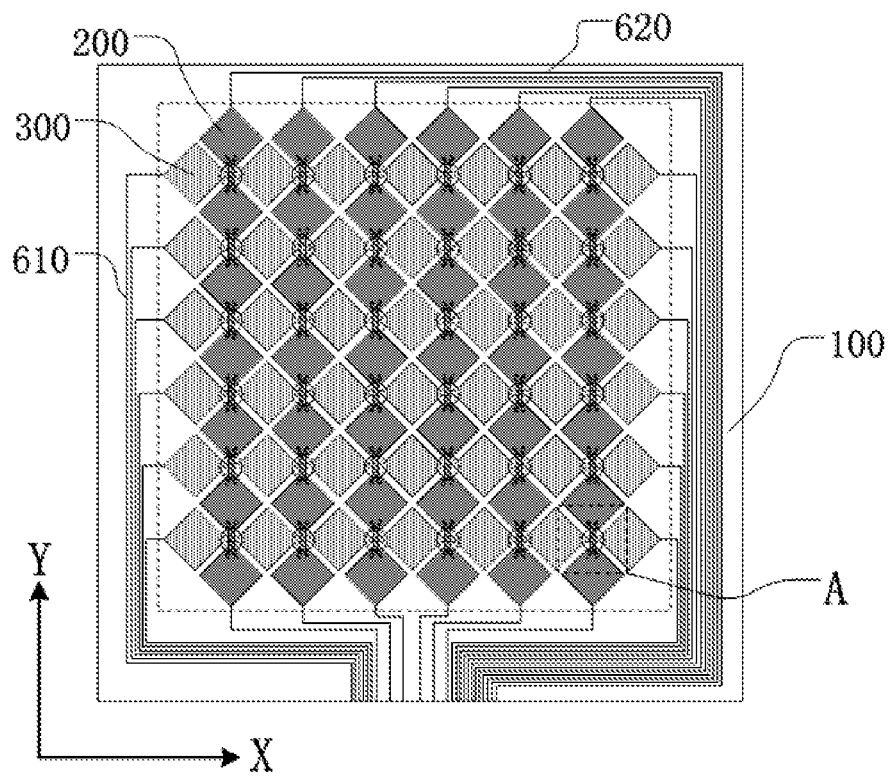
FIG. 9A to FIG. 9B are still another process diagrams of a manufacturing method of a touch substrate, as provided by an embodiment of the present disclosure.
Figure 9B:
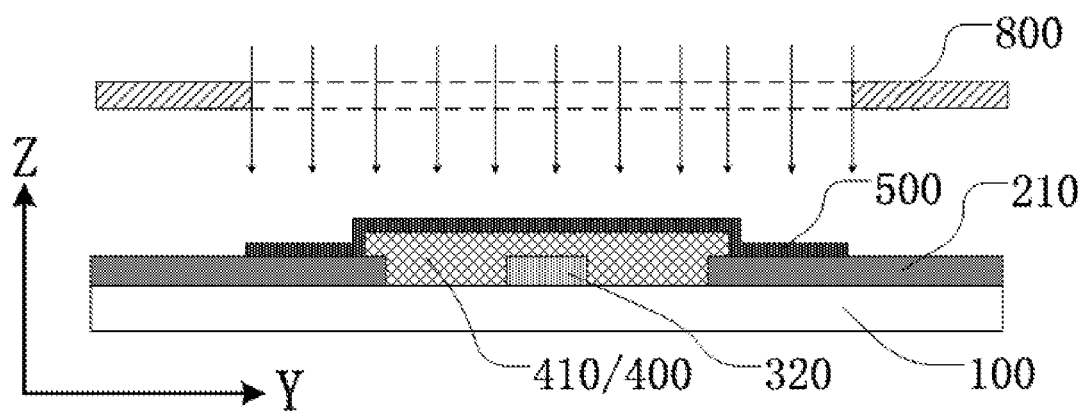

FIG. 9B is a sectional view of a region A shown in FIG. 9A, and as shown in FIG. 9A and FIG. 9B, a first mask 800 is provided, and by using the first mask 800, the conductive material is deposited on the base 100 on which the insulating layer 400 is formed so as to form a plurality of conductive bridges 500. The conductive bridge 500 includes the main body portion 510 and the branch portion 520, and at least two branch portions 520 are arranged at at least one end of the main body portion. For example, in a direction of the Z axis, the orthogonal projection of the main body portion 510 on the base 100 is at least partially positioned in the orthogonal projection of the sub insulating layer 410 on the base 100, and the orthogonal projection of the branch portion 520 on the base 100 is at least partially positioned outside the orthogonal projection of the sub insulating layer 410 on the base 100. For example, a method for forming the conductive bridge 500 by the first mask 800 may include magnetron sputtering and the like. The structure of the conductive bridge 500 may refer to related illustration in the above-mentioned embodiments (the embodiments related to the touch substrate), and the embodiments of the present disclosure will not repeat it herein.

It should be noted that in the manufacturing method of the touch substrate, as provided by at least one embodiment of the present disclosure, forming manners of the first signal line and the second signal line are not limited and may refer to related illustration in the above-mentioned embodiments (for example, the embodiment related to the manufacturing method of the touch substrate, as shown in FIG. 7), and the present disclosure will not repeat it herein.

At least one embodiment of the present disclosure provides the touch substrate and the manufacturing method thereof and the display panel, and can have at least one of the beneficial effects as follows:

(1) At least one embodiment of the present disclosure provides the touch substrate, the conductive bridge in the touch substrate is configured to be of a branch structure including a plurality of branch portions, and in the bent state, a portion of stress in the conductive bridge is shared to different branch portions, so as to prevent the conductive bridge from being broken caused by the excessive partial stress due to stress centralization.

(2) In the touch substrate provided by at least one embodiment of the present disclosure, the branch portion of the conductive bridge can increase the contact area between the conductive bridge and the first electrode strip and improve firmness of connection between the conductive bridge and the first electrode strip.

(3) In the touch substrate provided by at least one embodiment of the present disclosure, the branch portion of the conductive bridge can increase the sectional area of the current transmission channel of the conductive bridge and reduce the resistance of the conductive bridge.

(4) In the touch substrate provided by at least one embodiment of the present disclosure, the edge, in contact with the conductive bridge, of the surface of the insulating layer, which faces the conductive bridge, is designed to be of an arc shape, so that stress distribution of the conductive bridge at the edge can be improved, and the conductive bridge can be prevented from being broken due to excessive partial stress.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a region may be enlarged or decreased, that is, the accompanying drawings are not drawn according to the actual scale.

(3) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The invention claimed is:

1. A touch substrate, comprising:
   a base, including a touch region and a lead region positioned around the touch region;
   a plurality of first electrode strips, arranged side by side on the base in the touch region, the first electrode strip including a plurality of first sub-electrodes arranged at intervals; and
   a plurality of conductive bridges, arranged on the base in the touch region, two adjacent first sub-electrodes in the first electrode strip being electrically connected by one of the plurality of conductive bridges,
   wherein the conductive bridge includes a main body portion and a branch portion which are directly connected with each other, and at least two branch portions are arranged at least one end of the main body portion.

2. The touch substrate according to claim 1, further comprising:
   a plurality of second electrode strips, arranged side by side on the base in the touch region, the plurality of second electrode strips and the plurality of first electrode strips being arranged in an identical layer, an extension line where the first electrode strip is positioned intersecting with an extension line where the second electrode strip is positioned, and the second electrode strip including a plurality of second sub-electrodes arranged at intervals and a connecting portion for connecting the adjacent second sub-electrodes,
   wherein in a direction perpendicular to a plane where the base is positioned, the connecting portion is overlapped with at least one portion of the main body portion of the conductive bridge.

3. The touch substrate according to claim 2, wherein
   at least one portion of the main body portion and the branch portion of each of the plurality of conductive bridges are arranged in different layers, and in the direction perpendicular to the plane where the base is positioned, the branch portion directly contacts with the first sub-electrode a portion of which is overlapped with the branch portion, so that the branch portion is connected with the first sub-electrode.

4. The touch substrate according to claim 3, wherein
   the branch portion is entirely in contact with the first sub-electrode corresponding to the branch portion.

5. The touch substrate according to claim 2, further comprising:
   an insulating layer, arranged between the connecting portions of the plurality of second electrode strips and the plurality of conductive bridges,
   wherein the insulating layer includes a plurality of sub insulating layers spaced from each other, the sub insulating layers are arranged to correspond to the conductive bridges in a one-to-one correspondence, and
   at least one portion of an orthogonal projection of the main body portion on the base is positioned within an orthogonal projection of the sub insulating layer on the base, and an orthogonal projection of the branch portion on the base is positioned outside the orthogonal projection of the sub insulating layer on the base.

6. The touch substrate according to claim 5, wherein an edge contacting with the conductive bridge of a surface of the sub insulating layer, which is parallel to the plane where the base is positioned and is away from the connecting portion, is of an arc shape.

7. The touch substrate according to claim 2, wherein the main body portion and the branch portion of each of the plurality of conductive bridges are arranged in an identical layer.

8. The touch substrate according to claim 7, further comprising:
an insulating layer, arranged between the connecting portions of the plurality of second electrode strips and the plurality of conductive bridges, a via hole being disposed in the insulating layer,
wherein the first sub-electrode is electrically connected with the conductive bridge through the via hole.

9. The touch substrate according to claim 1, wherein in a plane parallel to a plane where the base is positioned, an edge of the branch portion is of an arc shape.

10. The touch substrate according to claim 1, wherein at an identical end of the main body portion, an included angle between two adjacent branch portions is 30 degrees to 60 degrees.

11. The touch substrate according to claim 1, wherein at an identical end of the main body portion, at least two branch portions are arranged axially symmetrically with respect to an extension line of the main body portion.

12. The touch substrate according to claim 1, wherein the main body portion includes at least two conductive strips arranged side by side at intervals, and at least one branch portion is arranged at one end of each of the at least two conductive strips.

13. The touch substrate according to claim 1, wherein the conductive bridge is arranged on a side of the first electrode strip, which is close to the base; or
the conductive bridge is arranged on a side of the first electrode strip, which is away from the base.

14. A display panel, comprising the touch substrate according to claim 1.

15. A manufacturing method of a touch substrate, comprising:
providing a base, the base including a touch region and a lead region positioned around the touch region;
forming a plurality of first electrode strips arranged side by side on the base in the touch region; and
forming a plurality of conductive bridges on the base in the touch region,
wherein the first electrode strip includes a plurality of first sub-electrodes arranged at intervals, two adjacent first sub-electrodes in the first electrode strip are electrically connected by one of the plurality of conductive bridges, the conductive bridge includes a main body portion and a branch portion which are directly connected with each other, and at least two branch portions are arranged at at least one end of the main body portion.

16. The manufacturing method according to claim 15, further comprising:
forming a plurality of second electrode strips arranged side by side on the base in the touch region,
wherein the second electrode strips and the first electrode strips are arranged in an identical layer and are intersected with each other, the second electrode strip includes a plurality of second sub-electrodes arranged at intervals and a connecting portion for connecting the adjacent second sub-electrodes, and in a direction perpendicular to a plane where the base is positioned, the connecting portion is partially overlapped with the main body portion.

17. The manufacturing method according to claim 16, wherein at least one portion of the main body portion and the branch portion of each of the plurality of conductive bridges are arranged in different layers, and the forming the plurality of conductive bridges on the base in the touch region includes:
depositing an insulating material film on the base and patterning the insulating material film to form an insulating layer including a plurality of sub insulating layers; and
depositing a conductive material film on the base on which the insulating layer is formed and patterning the conductive material film to form the plurality of conductive bridges, the sub insulating layers and the plurality of conductive bridges being arranged in a one-to-one correspondence,
wherein corrosion resistance of a preparation material of the conductive bridge is smaller than corrosion resistance of preparation materials of the second electrode strip and the first electrode strip, and in a direction perpendicular to a plane where the base is positioned, at least one portion of an orthogonal projection of the main body portion on the base is positioned within an orthogonal projection of the sub insulating layer on the base, and an orthogonal projection of the branch portion on the base is positioned outside the orthogonal projection of the sub insulating layer on the base.

18. The manufacturing method according to claim 16, wherein at least one portion of the main body portion and the branch portion of each of the plurality of conductive bridge are arranged in different layers, and the forming the plurality of conductive bridges on the base in the touch region includes:
depositing an insulating material film on the base and patterning the insulating material film to form an insulating layer including a plurality of sub insulating layers; and
providing a first mask, and depositing a conductive material on the base by using the first mask to form the plurality of conductive bridges, the sub insulating layers and the plurality of conductive bridges being arranged in a one-to-one correspondence,
wherein in a direction perpendicular to a plane where the base is positioned, at least one portion of an orthogonal projection of the main body portion on the base is positioned within an orthogonal projection of the sub insulating layer on the base, and an orthogonal projection of the branch portion on the base is positioned outside the orthogonal projection of the sub insulating layer on the base.

19. The manufacturing method according to claim 16, wherein the main body portion and the branch portion of each of the plurality of conductive bridge are arranged in an identical layer, and the forming the plurality of conductive bridges on the base in the touch region includes:
depositing an insulating material film on the base on which the plurality of first electrode strips are formed to form an insulating layer;

patterning the insulating layer to form a via hole in the insulating layer, the via hole exposing a portion of a region of the first sub-electrode; and depositing a conductive material film on the insulating layer and patterning the conductive material film to form the plurality of conductive bridges, the branch portion of the conductive bridge being electrically connected with the first sub-electrode through the via hole.

20. The manufacturing method according to claim 16, wherein the main body portion and the branch portion of each of the plurality of conductive bridges are arranged in an identical layer, and the forming the plurality of conductive bridges on the base in the touch region includes:

depositing a conductive material film on the base and patterning the conductive material film to form the plurality of conductive bridges;

depositing an insulating material film on the base on which the plurality of conductive bridges are formed to form an insulating layer; and patterning the insulating layer to form a via hole in the insulating layer, the via hole exposing a portion of a region of the conductive bridge, wherein the forming the plurality of first electrode strips arranged side by side on the base in the touch region includes:

depositing the conductive material film on the insulating layer and patterning the conductive material film to form the plurality of first electrode strips, two adjacent first sub-electrodes being electrically connected with the conductive bridge through the via hole.

* * * * *